United States Patent
Post

(10) Patent No.: US 6,858,962 B2
(45) Date of Patent: Feb. 22, 2005

(54) HALBACH ARRAY GENERATOR/MOTOR HAVING AN AUTOMATICALLY REGULATED OUTPUT VOLTAGE AND MECHANICAL POWER OUTPUT

(75) Inventor: Richard F. Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/946,250

(22) Filed: Sep. 5, 2001

(65) Prior Publication Data
US 2003/0071532 A1 Apr. 17, 2003

(51) Int. Cl.⁷ .................................................. H02K 1/00
(52) U.S. Cl. ...................................... 310/191; 310/112
(58) Field of Search ........................... 310/191, 74, 112, 310/113, 117, 121, 156.01, 254

(56) References Cited

U.S. PATENT DOCUMENTS

| | | | |
|---|---|---|---|
| 4,438,362 A | * 3/1984 | Brown | 310/152 |
| 5,495,221 A | 2/1996 | Post | 335/299 |
| 5,705,902 A | 1/1998 | Merritt et al. | 318/254 |
| 5,721,459 A | 2/1998 | Rao et al. | |
| 5,834,874 A | * 11/1998 | Krueger et al. | 310/191 |
| 5,883,499 A | 3/1999 | Post | 322/4 |
| 6,111,332 A | * 8/2000 | Post | 310/90.5 |
| 6,404,097 B1 | * 6/2002 | Pullen | 310/268 |

OTHER PUBLICATIONS

Klaus Halbach, "Application of permanent magnets in accelerators and electron storage rings (invited)"; Journal of Applied Physics; Apr. 15, 1985, pp. 3605–3608.

* cited by examiner

Primary Examiner—Thanh Lam
(74) Attorney, Agent, or Firm—John P. Woolbridge; Alan H. Thompson

(57) ABSTRACT

A motor/generator having its stationary portion, i.e., the stator, positioned concentrically within its rotatable element, i.e., the rotor, along its axis of rotation. The rotor includes a Halbach array. The stator windings are switched or commutated to provide a DC motor/generator much the same as in a conventional DC motor/generator. The voltage and power are automatically regulated by using centrifugal force to change the diameter of the rotor, and thereby vary the radial gap in between the stator and the rotating Halbach array, as a function of the angular velocity of the rotor.

20 Claims, 3 Drawing Sheets

HALBACH ARRAY GENERATOR/MOTOR HAVING AN AUTOMATICALLY REGULATED OUTPUT VOLTAGE AND MECHANICAL POWER OUTPUT

The United States Government has rights in this invention pursuant to Contract No. W-7405-ENG-48 between the United States Department of Energy and The University of California for the operation of Lawrence Livermore National Laboratory.

BACKGROUND OF THE INVENTION

1. Field of the Invention

The present invention relates generally to generators and motors and, more particularly, to automatically regulating their voltage and power as a function of the angular velocity of a rotor concentrically rotating around a stator.

2. Description of Prior Art

There are numerous applications that require compact pulsed-power systems with power outputs of hundreds of megawatts, associated with energy storage capabilities of hundreds of megajoules. These range from emergency power needs and utility electric power conditioning and stabilization, to pulsed laser fusion or magnetic fusion systems. Utilities employ battery banks or large cryogenic systems including superconducting magnets for energy storage. Condenser banks are commonly used in laser and magnetic fusion applications.

Flywheel energy-storage systems with rotors fabricated from high-strength fiber composite are integrated with high-power electrical generators for use during unexpected intermittent loss of network electrical power to sensitive electronic equipment, such as computers or automated production lines. One highly successful embodiment of such a system utilizes a generator/motor that employs permanent magnets arranged in a dipole version of the Halbach array configuration.

Halbach arrays comprise the most efficient way to employ permanent-magnet material for the generation of dipole and higher-order pole magnetic fields within a given volume of space. They require neither "back-iron" elements nor iron pole faces in their construction, and they produce fields that approach the theoretical ideal of field uniformity (dipole arrays) or of sinusoidal variation with rotation (higher-order arrays). As such they are ideally suited for use in generators or motors constructed with air-cored stator windings; that is, windings constructed without the use of the laminated iron elements typically used in conventional generators and motors. Using air-cored stator windings avoids the hysteresis losses and limitation on the peak power caused by the magnetic saturation of laminated iron elements and the increased inductance of the stator windings in comparison to air-cored stator windings.

A generator/motor that employs a dipole version of a Halbach array is described in U.S. Pat. No. 5,705,902, titled "Halbach Array DC Motor/Generator" issued to Bernard T. Merritt, Gary R. Dreifuerst, and Richard F. Post, the present inventor. A generator/motor system that employs higher-order Halbach arrays to produce its magnetic fields is described in U.S. Pat. No. 6,111,332, titled "Combined Passive Bearing Element/Generator Motor," also issued to Richard F. Post.

Flywheel energy storage systems typically operate over a range of angular velocity lying between a maximum determined by structural limitations, and one-half the maximum, at which point ¾ of the kinetic energy of the flywheel has been extracted. In the absence of voltage compensation, the output voltage will fall to half its initial value at this point. However, compensating for this great a change by electronic regulation or external circuits is expensive. An example of a means for regulation of the voltage that requires external circuitry is described in U.S. Pat. No. 5,883,499, "Method for Leveling the Power Output of an Electromechanical Battery as a Function of Speed," issued to the present inventor.

Motor/generators are useful in electric vehicles, adjustable-speed DC drives, and flywheel energy storage systems. The new invention incorporates novel features in such a way as to overcome some significant limitations of the prior art and to improve the performance of devices and systems incorporating motor/generators.

SUMMARY OF THE INVENTION

Briefly, the present invention is a motor/generator having its stationary portion, i.e., the stator, positioned concentrically within the rotor along its axis of rotation. The rotor includes a Halbach array. The stator windings are switched or commutated to provide a DC motor/generator much the same as in a conventional DC motor. The commutation may be performed by mechanical means using brushes or by electronic means using switching circuits. Centrifugal force changes the diameter of the rotor. This varies the radial gap in between the stator and the rotating Halbach array, and thus changes the output voltage or power.

DETAILED DESCRIPTION OF THE INVENTION

Figure 1:
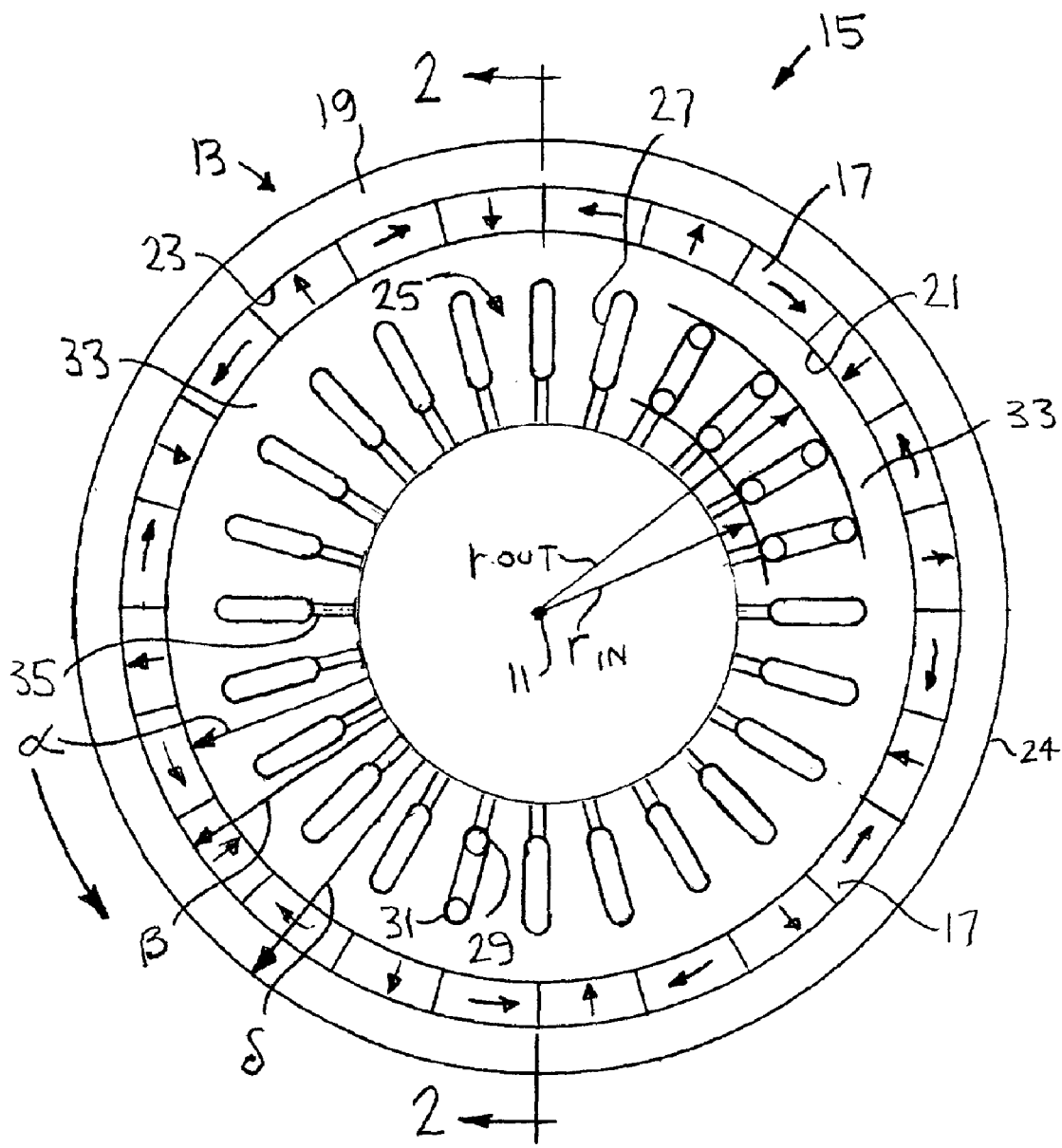
FIG. 1 is a section view taken normal to the axis of rotation of the rotor of the motor/generator of the present invention.

Turning to the drawings, FIG. 1 is a cross section taken normal to the axis of rotation 11 of rotor 13 of motor/generator 15 of the present invention. More particularly, rotor 13 includes Halbach array 17 consisting of magnets arranged in a Halbach configuration to form a cylinder about axis of rotation 11 and having a rotational degree of freedom about axis 11. Halbach array 17 is concentric with and attached to the inner circumference of cylinder 19. Halbach array 17 includes inner surface 21 lying at radius $\alpha$ with respect to axis 11, and outer surface 23 lying at radius $\beta$ with respect to axis 11. Cylinder 19 has an inner circumference having radius $\beta$ with respect to axis 11, and an outer surface 24 lying at radius $\delta$ with respect to axis 11.

Figure 2:
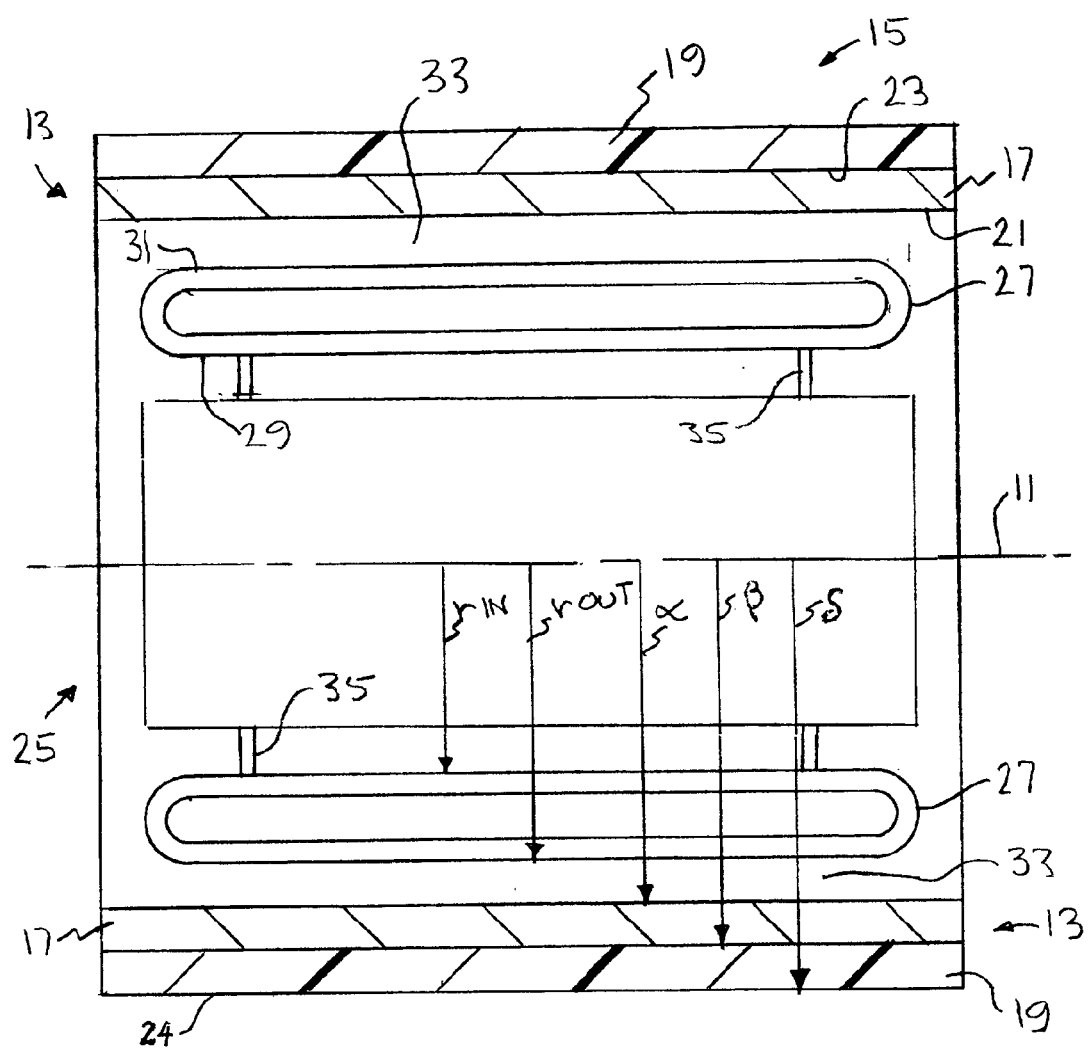
FIG. 2 is a section view of the motor/generator of the present invention taken along line 2—2 of FIG. 1.

Stator 25 lies concentrically within rotor 13, and does not rotate relative to axis 11. FIG. 2 is a cross section taken along line 2—2 of FIG. 1. As particularly shown therein, stator 25 includes conductive windings 27. Electrical leads for windings 27 are not shown. Each winding 27 is a rectangle comprised of inner section 29 located at inner radius $R_{in}$ with respect to axis 11, and outer section 31 located at outer radius $R_{out}$ with respect to axis 11. Gap 33 between each outer section 31 of windings 27 and inner surface 21 is thus equal to ($\alpha$-$R_{out}$). Each winding 27 is mounted on a rigid, non-extensible support 35.

Inner radius $\alpha$ varies as a function of centrifugal force as rotor 13 rotates at angular velocity $\omega_0$. $R_{out}$ of windings 27 remains constant. Thus, gap 33 will vary as a function of $\omega_0$. As will be subsequently explained, when motor/generator 15 functions as a generator, the voltage induced in windings 27 varies as a function of gap 33, and thus varies as a function of $\omega_0$. Furthermore, when motor/generator 15 functions as a motor, the back emf produced varies as a function of gap 33, and thus also varies as a function of speed.

With regard to the operation of motor/generator 15 as a generator, the upper limit to the specific power output (power output per kilogram of weight) of air-cored generators of the type of motor/generator 15 can be estimated by analyzing the so called Poynting vector, P, which defines the local value of the energy flux, in units of Watts/m², carried by an electromagnetic field. The Poynting vector, P, in a vacuum is defined by the equation:

$$P=(E \times B)/\mu_0 \text{ watts/m}^2 \quad (1)$$

where: E (Volts/m.) is the value of the electric field;
B (Tesla) is the magnetic field vector; and
$\mu_0$, the permeability of free-space,=$4\pi \times 10^{-7}$ (henrys/meter).

The electric field in the frame at rest (stator 25) arises from the relativistic transformation of the magnetic field from the rotating frame (rotor 13). This transformation is governed by the relativistic relationship:

$$(E+v \times B)=0 \quad (2)$$

where: v is the is the velocity vector in the direction of transport of the rotating magnetic field, and has only one component in this case, $v_\phi$ the azimuthal component.

Solving Equation 2 for E, inserting this result into equation 1, and performing the vector product called for therein results the following relationship for P:

$$P=[B^2 v-(v \cdot B)B]/\mu_0 \text{ watts/m}^2 \quad (3)$$

Taking the component of P in the direction of v provides an expression for the rate of power flow through the circuits.

$$(P \cdot v)/v=v_\phi B^2[1-\cos^2(\theta)]/\mu_0 \quad (4)$$

where the angle $\theta$ is the angle between v and B.

In the magnetic field emanating from rotating Halbach array 17, the angle $\theta$ rotates continuously at a rate equal to the angular velocity of rotor 13, $\omega_0$, multiplied by the order, N, of the pole. Taking the time average of the Poynting vector component gives a value for the average power through a surface area perpendicular to v as follows:

$$<(P \cdot v)/v>=v_\phi(B^2/2\mu_0) \text{ watts/m}^2 \quad (5)$$

This equation can be interpreted as representing the result of transporting magnetic stored energy, $U=(B^2/2\mu_0)$ Joules/m³ at a velocity, $v_\phi$, through a surface perpendicular to $v_\phi$. It is assumed that $v_0 \ll \delta$, where $\delta$ is the velocity of light. The magnitude of the energy flux represented in a practical situation can be estimated from the following example.

Assume that Neodymium-Iron-Boron permanent magnets, for which the remanent field, $B_r$ is equal to or greater than 1.2 Tesla, are used in Halbach array 17 and that the azimuthal velocity, $v_\phi$, of the array equals $10^3$ m/sec, a typical value for a fiber composite rotor. From the equations for Halbach array 17 given below, the peak surface field of the array, $B_0$, can be determined. In typical cases it is approximately equal to 1.0 Tesla. Using the above velocity and a surface magnetic field $B_0=1.0$ Tesla as illustrative values, the power per unit area predicted by Equation 5 is 400 mw/m². As will be later discussed, generators of the type that are the subject of the present invention can achieve power outputs into matched loads that represent a substantial fraction of this calculated incident power level, a level that represents the theoretical upper limit to the power transfer. Such power flux levels are very high as compared to conventional commercial iron-cored generators, for which the corresponding power flux levels are typically less than 1.0 mw/M².

Equation 5 can be used to provide an estimate of the power output of motor/generator 15, and to derive scaling laws for that power output. The magnetic field from Halbach array 17, in cylindrical coordinates, is given by the following equations:

$$B_\rho = B_0 \left[\frac{\rho}{\alpha}\right]^{N-1} \cos(N\phi) \quad (6)$$

$$B_\phi = -B_0 \left[\frac{\rho}{\alpha}\right]^{N-1} \sin(N\phi) \quad (7)$$

$$B^2 = B_0^2 \left[\frac{\rho}{\alpha}\right]^{2N-2} \quad (8)$$

where: $B_0 = B_r \left[\frac{N}{N-1}\right][1-(\alpha/\beta)^{N-1}]C_N \quad (9)$ $$C_N = \cos^N(\pi/M)\left[\frac{\sin(N\pi/M)}{(N\pi/M)}\right] \quad (10)$$

$\rho$(m.) is the radius variable;
N is the pole order of array 17 (the number of wavelengths around inner surface 21);
$B_r$ is the remanent field of the permanent-magnet material; and
M is the total number of magnets in array 17. (As there are 4 magnets per azimuthal wavelength in the Halbach array shown in FIG. 1, in this case M=4N).

To evaluate the Poynting vector of the power flux from the Halbach array 17, it is necessary to insert $B^2$ from equation 8 into Equation 5, set $v_\phi=\rho\omega_0$, and integrate over the radius between 0 (axis 11) and $\alpha$, thereby finding the maximum value of the power flux through a single winding 27 having an axial length h(m.), and lying in a radial plane. The result is:

$$P_0 = h \int_0^\alpha \left[\frac{\langle P \cdot v \rangle}{v}\right] d\rho = \frac{B_0^2 \alpha^2 h \omega_0}{4\mu_0 N} \text{ watts/winding} \quad (11)$$

More power can be extracted, of course, by increasing the number of windings 27 deployed azimuthally. At some point, however, the energy extracted will approach the limiting rate at which it can flow in from the electromagnetic field. In keeping with the purpose of this discussion, no attempt will be made to solve the problem of determining the ideal number of windings 27; instead, it is assumed that if windings 27 are spaced one half-wavelength apart azimuthally, they will be sufficiently decoupled from each other so that the following simple calculation will provide a reasonable estimate. As will be later shown, where an explicit calculation is done for the energy coupled out of windings 27 into a matched load, this assumption is useful for determining the scaling laws of the system and for estimating the maximum power output that can be expected.

Assuming that the number of windings 27 equals 2N (i.e., that they are spaced one-half wavelength apart, the total power flow through the area circumscribed by windings 27 is expressed as follows:

$$P_{2N} = \left[\frac{B_0^2 \alpha^2 h \omega_0}{2\mu_0}\right] \text{ watts} \tag{12}$$

In the simplest terms, this result corresponds to an amount of magnetic energy flowing through windings 27 at an angular frequency $\omega_0$(rad./sec.) of rotor 13 and Halbach array 17. The controlling parameters are thus the radius, $\alpha$, and length, h, of the system, and the angular velocity, $\omega_0$, of Halbach array 17. The radius, $\alpha$, and the angular velocity, $\omega_0$, are, of course, interrelated, owing to centrifugal forces that limit $\omega_0$. The order of the array, N, does not directly enter into the above expression, although there will later appear reasons to employ high-order (N>>2) Halbach arrays in order to enhance the performance of motor/generator 15.

To calculate the power output that can be expected, assume:
$\alpha$=0.5 meter;
h=1.5 meters;
$B_0$=1.0 Tesla; and
$\omega_0$=2096 rad./sec. (20,000 rpm).
Inserting these values into Equation 12 gives a power level of 625 megawatts.

Several requirements must be satisfied to achieve such high power levels from a relatively small generator. Firstly, the angular velocity, $\omega_0$, of rotating Halbach array 17 must be sufficiently high. This requirement in turn implies that cylinder 19 must withstand the centrifugal force exerted on its inner surface by Halbach array 17. A practical solution to this problem is to fabricate cylinder 19 from a high-strength fiber composite material, such as carbon fibers bonded with epoxy resins. To avoid delamination of cylinder 19 from centrifugal stress, the wall thickness of cylinder 19 is typically limited to a radius ratio, i.e., the ratio of its outer radius, $\delta$, to its inner radius, $\beta$, of no more than 1.3. When the inertial effect of Halbach array 17 on its inner surface 21 is taken into account, the peak tensile stress produced in such a thin-walled cylinder may be approximated by the following equation:

$$S = \rho_\delta [\omega_0 \beta]^2 G \text{ newtons/m}^2 \tag{13}$$

$$\text{where: } G = \frac{\frac{\rho_m}{\rho_\delta}\left\{1 - \left[1 - \frac{\alpha}{\beta}\right]^3\right\} + \left\{\left[\frac{\delta}{\beta}\right]^3 - 1\right\}}{3\left[\frac{\delta}{\beta} - 1\right]} \tag{14}$$

$\rho_\delta$ (kg/m$^3$) is the density of the material composing cylinder 19; and
$\rho_m$ (kg/m$^3$) is the density of the magnets composing Halbach array 17.

For a thin Halbach array 17 and a thin composite cylinder 19, the function G approaches the limit of 1.0. When this value for G is inserted into Equation 13, the answer corresponds to the minimum possible stress value in cylinder 19 for a given value of radius $\beta$, and angular velocity, $\omega_0$.

The optimum thickness for Halbach array 17 corresponds to that thickness which maximizes the ratio of the generating capacity to the mass of Halbach array 17. The generating capacity is proportional to $(B_0)^2$, which is in turn a function of the thickness of Halbach array 17 (see Equation 9). Taking these competing variables into account, the optimum magnet thickness (for N>>1) turns out to be 0.20 $\lambda$, where $\lambda$(m.) is the azimuthal wavelength of Halbach array 17, given by the equation:

$$\lambda = 2\pi\alpha/N \text{ meters} \tag{15}$$

Under the stress produced by centrifugal forces, the inner radius of cylinder 19, $\beta$, and the inner radius, $\alpha$, of the Halbach array 17 will expand radially, increasing gap 33 between inner surface 21 of Halbach array 17 and outer section 31 of windings 17. This radial expansion, $\Delta r$, which is an important factor in the embodiment of the invention, is given by the equation:

$$\Delta r = (S/Y)\left[\frac{\beta + \delta}{2}\right] \text{ meters} \tag{16}$$

where: S(Newtons/m$^2$) is the mean stress level in rotor 13, and
Y(Newtons/m$^2$) is the Young's modulus of the composite of cylinder 19. From Equation 13 it can be seen that the stress in rotor 13 increases in proportion to the square of the angular velocity, $\omega_0$.

Figure 3:
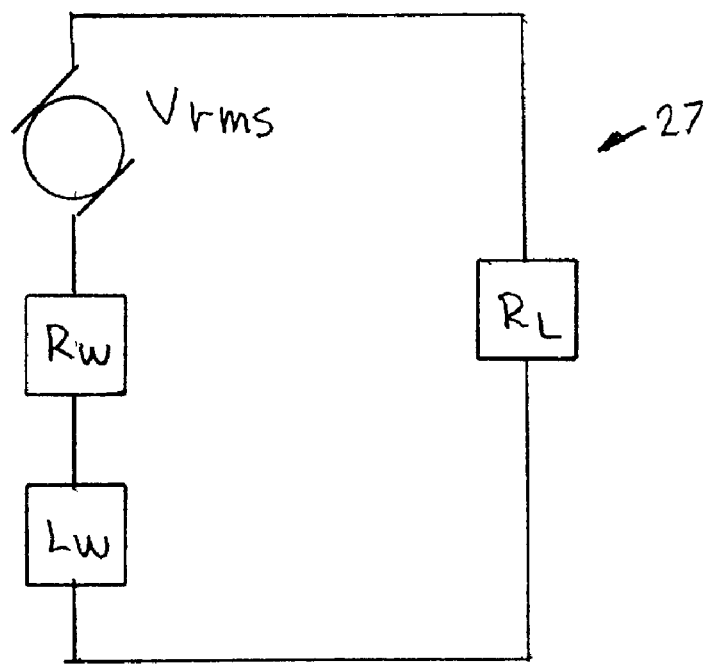
FIG. 3 is a schematic drawing of a stator winding of the present invention, represented by a series circuit composed of a voltage source, two resistors, and an inductor.

In the analysis of generator/motor 15 for the purpose of optimizing its power output, the issue of maximizing the power transfer to an external load must be considered. Since there are no ferro-magnetic materials in motor/generator 15, the elements of windings 27 are all linear and the analysis is greatly simplified. Each winding 27 and its load can therefore be electrically represented by the circuit diagram shown in FIG. 3.

More particularly, the rotating Halbach array 17 of FIG. 1 induces an rms voltage, $V_{rms}$, in the stator windings 27, characterized by an inductance, $L_w$ (henrys), and a series resistance, $R_w$ (ohms). The output current is delivered to a load resistance, $R_{load}$. In practice, $R_w << R_{load}$ and $R_w$ can be neglected in comparison to other quantities. In this case the maximum power that can be delivered occurs for a load resistance equal to the inductive impedance of windings 27, $\omega L_w$, and is given by the equation:

$$P_{max} = \frac{1}{2}\left[\frac{V_{rms}^2}{\omega L_w}\right] \text{ watts} \tag{17}$$

where: $\omega$ is the frequency for the output voltage and is equal to $N\omega_0$; and
$V_{rms}$ is the output voltage.

$V_{rms}$ may be determined using the equations for the magnetic field of Halbach array 17, i.e., equations 6, 7, 9, and 10. The voltage in winding 27 is derived from the time-varying azimuthal flux through the area between $r_{out}$ and $r_{in}$ produced by the azimuthal component of the fields of Halbach array 17. Integrating this field component over the area circumscribed by one of windings 27 results in an expression for the induced voltage as a function of time:

$$V(t) = B_0 \alpha h \omega_0 \left[\frac{r_{out}}{\alpha}\right]^N \left\{1 - \left[\frac{r_{in}}{r_{out}}\right]^N\right\} \cos(N \omega_0 t) \text{ volts} \tag{18}$$

The square of the rms value of this expression may now be inserted into Equation 17 to determine the maximized power per winding into a matched load. The result is given by the following equation:

$$P_{max} = \frac{1}{4}\left[\frac{B_0^2 \alpha^2 h^2 \omega_0}{N L_g}\right]\left(\frac{r_{out}}{\alpha}\right)^{2N}\left[1 - \left(\frac{r_{in}}{r_{out}}\right)^N\right]^2 \text{ watts/winding} \quad (19)$$

The inductance (self plus mutual) of one of windings 27 has been calculated using theory and may be used to evaluate the inductance term, $L_g$, in Equation 19. The result is:

$$L_g = \frac{\mu_0 P_\delta}{2 k d_\delta} \text{ henrys} \quad (20)$$

where: $P_\delta$(m.) is the distance around the perimeter of one of windings 27; that is, the length of the conductor comprising one of windings 27.

$k = 2\pi/\lambda = N/a$ is the azimuthal wavelength of Halbach array 17; and $d_\delta$(m.) is the center-to-center spacing (in the azimuthal direction) between the circuits of windings 27.

Substituting equation 20 for $L_g$ in Equation 19 results in an expression for the maximized power per winding:

$$P_{max} = \frac{1}{2}\left[\frac{B_0^2 \alpha^2 h^2 \omega_0 d_\delta}{\mu_0 P_\delta}\right]\left(\frac{r_{out}}{\alpha}\right)^{2N}\left[1 - \left(\frac{r_{in}}{r_{out}}\right)^N\right]^2 \text{ watts/winding} \quad (21)$$

The maximized total output of motor/generator 15 is then given by multiplying Equation 21 by the number of windings 27, $n_w$, given by the ratio of the circumference of windings 27 to the center-to-center azimuthal spacing in between adjacent individual windings 27:

$$n_w = 2\pi r_{out}/d_\delta \quad (22)$$

The maximized total power output is thus given by the following equation:

$$\sum P_{max} = \left[\frac{\pi B_0^2 \alpha^2 h^2 \omega_0}{\mu_0 P_\delta}\right]\left(\frac{r_{out}}{\alpha}\right)^{(2N+1)}\left[1 - \left(\frac{r_{in}}{r_{out}}\right)^N\right]^2 \text{ watts} \quad (23)$$

Note that the distance around the perimeter of one of windings 27, $P_c$, is given by the expression:

$$P_\delta = 2[h + (r_{out} - r_{in})] = 2h\left[1 + \left(\frac{r_{out}}{h}\right)\left(1 - \frac{r_{in}}{r_{out}}\right)\right] \text{ meters} \quad (24)$$

where $(r_{out} - r_{in})$ is the radial depth of windings 27.

Equation 24 may be used to obtain a further optimization of the power output. Note that the amount of flux enclosed by an individual winding 27 depends on the area it circumscibes, which is equal to its radial depth, $(r_{out} - r_{in})$, multiplied by its length, h. Increasing the circumscribed area therefore increases the induced voltage. However, as shown by Equations 20 and 24, increasing the circumscribed area also increases the inductance of the winding, which, as shown by Equation 17, would decrease the power output. There are thus two competing effects, the result of which is to define an optimum value for the area circumscribed by a singular winding of windings 27. To determine the optimum radial depth of windings 27, Equation 24 is substituted into Equation 23:

$$\sum P_{max} = \left[\frac{\pi B_0^2 \alpha^2 h^2 \omega_0}{2\mu_0}\right]\left(\frac{r_{out}}{\alpha}\right)^{(2N+1)}\left\{\frac{\left[1 - \left(\frac{r_{in}}{r_{out}}\right)^N\right]^2}{\left[1 + \left(\frac{r_{out}}{h}\right)\left(1 - \frac{r_{in}}{r_{out}}\right)\right]}\right\} \text{ watts} \quad (25)$$

Letting $x = r_{in}/r_{out} < 1$ the expression in braces can be written as:

$$F(x) = \frac{[1 - x^N]^2}{\left[1 + \left(\frac{r_{out}}{h}\right)(1 - x)\right]} \quad (26)$$

The function $F(x)$ has a maximum value, $F_{max}$, as a function of x for given values of N and $(r_{out}/h)$. Inserting this value into Equation 25 there results the final maximized expression for the power output:

$$\sum P_{max} = \pi\left[\frac{B_0^2 \alpha^2 h \omega_0}{2\mu_0}\right]\left(\frac{r_{out}}{\alpha}\right)^{(2N+1)} F_{max} \text{ watts} \quad (27)$$

Note that the term in square brackets is identical to the expression in Equation 12. This equation was obtained by using Poynting's Theorem to estimate the maximum possible power output from motor/generator 15 and to determine the scaling laws for that output in terms of the magnetic field and dimensional parameters of the generator.

As an example of the use of Equation 27 for the design of a generator, consider the following parameters for a physically small generator, but one with a relatively high power output.

α=0.5 m.
h=1.5 m.
N=64
$r_{out}/a$=0.98
$B_0$=magnetic field of Halbach array 17=1.0 Tesla
$\omega_0$=2090 radians/sec. (20,000 rpm)

The maximum value for $F(x)$ in Equation 26, $F_{max}$, is the optimal value for the radial depth of windings 27: $F_{max}$= 0.981 at x=0.949. Inserting this value for $F_{max}$ and the value of the other parameters into Equation 27 gives a maximized power output of 145 megawatts. This power level is to be compared with the theoretical upper limit to the power transfer, 625 megawatts, obtained from Equation 12. This example demonstrates the assertion made earlier that output powers that are a substantial fraction of the theoretical maximum can be achieved with generators of the present invention.

The foregoing derivations and discussion provide a basis for describing the present invention. Consider first the means for regulating and controlling the power output of motor/generator 15. The means proposed can be understood by examination of Equation 27 for the power output. This equation contains a term, $(r_{out}/\alpha)^{2N}$, that expresses the variation in output with the outer radius, rout of windings 27 relative to the inner radius, α, of Halbach array 17. If N>>1 this term becomes very sensitive to the ratio of the two radii, i.e., to gap 33 between the inner surface 21 of Halbach array 17 and the outer sections 31 of windings 27. Using the parameters of the previous example, N=64, α=0.5 m. and $(r_{out}/\alpha)$=0.98; gap 33 equals 0.02*α=0.01 m. From Equation 27, a decrease in gap 33 by 1.0 mm would result in an increase in the power output from 145 megawatts to 188 megawatts. This example shows the power produced by motor/generator 15 can be regulated by varying gap 33, e.g., by designing rotor 13 so that radius a changes by a predicted amount as a function of centrifugal force, i.e., as a function of the angular velocity, $\omega_0$, of rotor 13.

Accordingly, motor/generator 15 provides for automatically holding its voltage output approximately constant as the angular velocity, $\omega_0$, decreases below its maximum value, down to an operational minimum. Such a situation would be encountered if motor/generator 15 is incorporated into a flywheel for use as an integral part of an energy storage device. The foregoing embodiment takes advantage of the naturally occurring variation of the circumference of rotor 13 in proportion to its angular velocity, $\omega_0$, owing to the changing centrifugal force acting radially outward against rotor 13. That is, as $\omega_0$ increases, rotor 13 radially expands and gap 33 increases, resulting in a corresponding decrease in the voltage output. It follows that as $\omega_0$ slows down, gap 33 decreases and the output voltage increases. The increased output voltage occurring with a decrease in gap 33 can be used to compensate for the decrease in output voltage of the generator associated with a decrease in $\omega_0$ (see Equation 18).

Equation 13 indicates that the mean stress level in the composite rotor 13 will vary as the square of the rotational angular velocity, $\omega_0$. Equation 16 indicates that the inner radius, $\alpha$, of the composite rotor 13 will increase linearly with the mean stress level. The magnets comprising Halbach array 17, being restrained by cylinder 19, will move outward along with cylinder 19 as it expands radially. It follows that the relationship between the inner radius of the Halbach array 17 at angular velocity $\alpha(\omega_0)$, and that same inner radius at zero angular velocity, $\alpha_0$, can be expressed by the following equation:

$$\alpha(\omega_0) = \alpha_0 \left[ 1 + f \left( \frac{\omega_0^2}{\omega_{max}^2} \right) \right] \quad (28)$$

where: f is a constant determined from the Young's modulus of the composite of cylinder 19, taking into account that, as noted, the magnets comprising Halbach array 17, since they are being supported by the inner circumference of cylinder is 19, will move radially with the inner circumference of cylinder 19 as it expands from centrifugal force; for example, f=0.015 (i.e., 1.5% expansion between $\omega_0$=0 and $\omega_{max}$) for a typical carbon fiber composite material under tensile stress; and $\omega_{max}$ is the maximum angular velocity of rotor 13.

The second equation needed, derived from Equation 18, is the expression for the rms voltage output of motor/generator 15:

$$V_{rms} = \frac{1}{2} B_0 \alpha h \omega_0 \left[ \frac{r_{out}}{\alpha} \right]^N \left\{ 1 - \left( \left[ \frac{r_{in}}{r_{out}} \right] \right)^N \right\} \text{ volts} \quad (29)$$

Equations 28 and 29 can be combined to give the ratio of the output voltage at angular velocity $\omega_0$, to that at the maximum operating speed, $\omega_{max}$. By defining the variable y as the ratio of the operating speed, $\omega_0$, to the maximum operating speed, $\omega_{max}$, i.e., $$y = \frac{\omega_0}{\omega_{max}} \quad (30)$$

the ratio of the voltage at a given $\omega_0$ to its maximum value is given by the equation:

$$\frac{V_{rms}}{V_{rms}(\max)} = H(y) = y \left[ \frac{1+f}{1+fy^2} \right]^{N-1} \quad (31)$$

To achieve voltage compensation, that is, to require that the voltage should not begin to decrease as the rotor slows down, it is required that the function H(y) should have a maximum for y<1. This condition can be found by differentiating H(y) with respect to y and setting the derivative equal to zero. The result is given by the equation:

$$y = \sqrt{\frac{1}{f(2N-3)}} \quad (32)$$

Requiring that a maximum should occur for a frequency below the maximum operating speed implies a lower limit on the value of N. From Equation 32 this condition is given by the inequality:

$$N \geq \frac{1}{2}\left(\frac{1}{f} + 3\right) \quad (33)$$

Taking f=0.015 as before, the inequality requires N>35. Larger values of N are required if regulation is to be effective over a large range of $\omega_0$.

The equations given above can be used to determine the value of N required to perform automatic voltage regulation for, as an example, an angular velocity, $\omega_0$, ranging over a factor of two, that is, to require that the voltage at half speed, $\omega_0=(\frac{1}{2})\omega_{max}$, should be the same as that at full speed, $\omega_0=\omega_{max}$ (with a modest voltage rise in between). This voltage regulation requirement is given by equating H(y=1) and H(y=½), yielding an equation for N.

$$N = 1 + \frac{\log_e(2)}{\log_e\left[\frac{1+f}{1+(f/4)}\right]} \quad (34)$$

Figure 4:
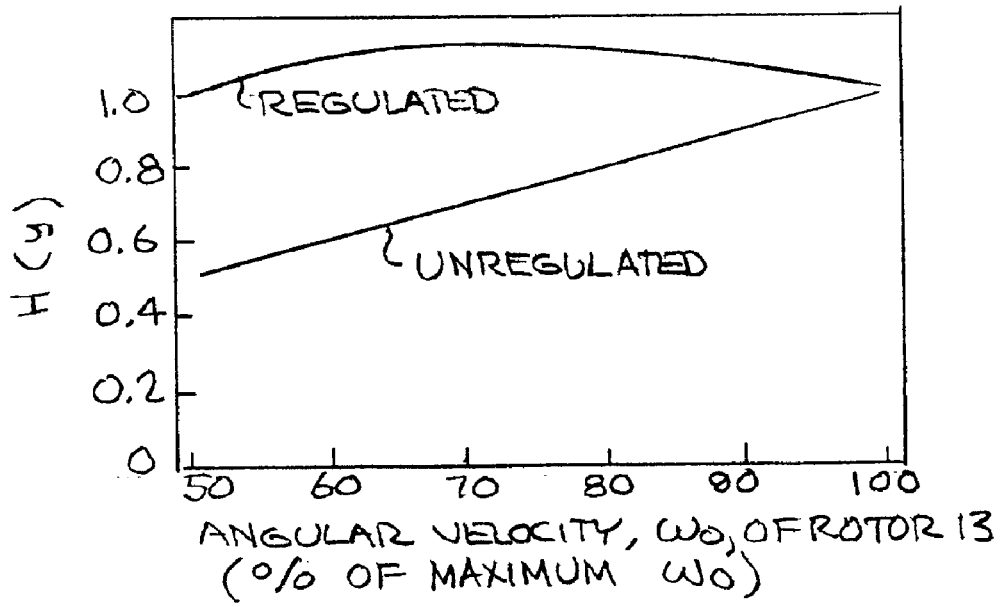
FIG. 4 is composed of two graphs: a function for the regulated voltage generated by the generator/motor of the present invention and the same function for the unregulated voltage generated by a generator/motor of the prior art, with both graphs plotted on the ordinate as a function of the angular velocity of the rotor shown as a percentage of its maximum angular velocity.

For f=0.015, the nearest-integer value of N found from Equation 34 is N=64. The value of the voltage regulation function, H(y) for N=64 and f=0.015 is plotted in FIG. 4 over the range $\omega_0=(\frac{1}{2})\omega_{max}$ to $\omega_{max}$. As shown therein, the regulated voltage output remains constant within a few percent over the entire operating range of rotor 13. For comparison, the unregulated voltage is also shown. As the graph indicates, the unregulated voltage output would vary by a factor of 2 over this same operating range.

The foregoing description of the automatic regulation of the voltage output of motor/generator 15 when operated as a generator is also applicable to its operation as a motor. More particularly, the variation in gap 33 that occurs as a function of variable angular velocity, $\omega_0$, of rotor 13, will increase the torque at a constant input current as the motor speed drops. This action will therefore compensate for the loss of power capability at a constant input current that would otherwise occur as the motor speed drops. This enhances the versatility of motor/generator 15 operating in a motor mode.

It is to be understood, of course, that the foregoing description relates only to embodiments of the invention, and that modification to these embodiments may be made without departing from the spirit and scope of the invention as set forth in the following claims.

I claim:

1. A motor/generator for regulating an output voltage or a mechanical power output, comprising:

a rotor including a Halbach array;

said rotor being capable of rotating at a variable angular velocity;

a stator including a plurality of electrically conductive windings;

a variable gap separating said rotor and said stator; and means for adjusting said gap responsive to said angular velocity to automatically regulate an output voltage or a mechanical power output.

2. The motor/generator of claim 1, wherein:

said means comprises a centrifugal force acting against said rotor and said rotor having a diameter that varies in response to said centrifugal force, whereby said gap varies in response to said centrifugal force.

3. The motor/generator of claim 2, wherein:

said angular velocity has an operating range; and said means maintains said output voltage at an approximately constant voltage value over said operating range.

4. The motor/generator of claim 2, wherein:

said angular velocity has an operating range; and said adjusting means maintains said mechanical power output at an approximately constant power value over said operating range.

5. The motor/generator of claim 2, wherein:

said rotor is rotatable about an axis of rotation;

said stator is stationary relative to said axis of rotation;

said stator and said rotor are concentric, with said stator lying closer to said axis than said rotor; and said gap varies radially relative to said axis of rotation.

6. The motor/generator of claim 5, wherein:

said Halbach array comprises a plurality of magnets configured in a cylindrical shape, and has an inner surface and an outer surface, with said inner surface being closer to said axis of rotation than said outer surface; and said rotor includes a cylinder attached to said outer surface.

7. The motor/generator of claim 6, wherein said cylinder comprises a fiber composite.

8. The motor/generator of claim 6, wherein:

each of said windings has an approximately rectangular shape including an inner section and an outer section, with said inner section being closer to said axis of rotation than said outer section; and said gap being in between said inner surface of said Halbach array and said outer section of said windings.

9. The motor/generator of claim 8, further comprising a plane intersecting each winding of said windings, respectively, and said axis of rotation; and each winding of said windings being azimuthally spaced apart from each other, whereby each winding of said windings are azimuthally disposed around said axis of rotation.

10. The motor/generator of claim 7, wherein:

said Halbach array generates a magnetic field having a pole order;

said cylinder has a Young's modulus; and said output voltage and said mechanical power output are also a function of said pole order and said Young's modulus.

11. The motor/generator of claim 10, wherein said Halbach array includes a plurality of magnets equal to four times said pole order.

12. A method for automatically regulating an output voltage of a generator comprising:

generating an output voltage by rotating a rotor at a variable angular velocity with respect to a stator, wherein said rotor includes a Halbach array; and varying a gap between said rotor and said stator responsive to said angular velocity.

13. The method of claim 12, further comprising maintaining said output voltage at an approximately constant voltage value over an operating range of said angular velocity.

14. The method of claim 13, wherein said gap is varied by radially translating said rotor relative to said stator by applying a centrifugal force to said rotor.

15. A method for automatically regulating a mechanical power output of a motor, comprising:

rotating a rotor at a variable angular velocity with respect to a stator by applying a variable voltage input to said stator, wherein said rotor includes a Halbach array; and varying a gap between said rotor and said stator responsive to said angular velocity.

16. The method of claim 15, further comprising maintaining said mechanical power output at an approximately constant power value over an operating range of said angular velocity.

17. The method of claim 16, wherein said gap is varied by radially translating said rotor relative to said stator by applying a centrifugal force to said rotor.

18. A motor/generator for automatically regulating an output voltage or a mechanical power output, comprising:

a Halbach array being radially spaced apart from a stator by a variable gap and being rotatable relative to said stator at an angular velocity; and said gap being automatically varied as a function of said angular velocity.

19. The motor/generator of claim 18, further comprising:

a voltage being generated by rotation of said Halbach array at said angular velocity;

said angular velocity having a range; and said gap being responsive to a centrifugal force generated by said angular velocity and maintaining an output voltage at an approximately constant voltage value over said angular velocity range.

20. The motor/generator of claim 18, wherein:

said Halbach array is rotated at said angular velocity by an input voltage applied to said stator;

said input voltage has a range; and said gap is responsive to a centrifugal force generated by said angular velocity and maintains said angular velocity at an approximately constant value over said input voltage range.

* * * * *